US010656614B2

United States Patent
Londo et al.

(10) Patent No.: US 10,656,614 B2
(45) Date of Patent: May 19, 2020

(54) TOOL MANAGEMENT SYSTEM

(71) Applicant: TRL ENTERPRISES, LLC, Ashland, MA (US)

(72) Inventors: Thomas R. Londo, Ashland, MA (US); Scott Kohlstrom, Brookfield, MA (US)

(73) Assignee: TRL ENTERPRISES, LLC, Ashland, MA (US)

( * ) Notice: Subject to any disclaimer, the term of this patent is extended or adjusted under 35 U.S.C. 154(b) by 554 days.

(21) Appl. No.: 15/341,617

(22) Filed: Nov. 2, 2016

(65) Prior Publication Data

US 2017/0123399 A1     May 4, 2017

Related U.S. Application Data

(60) Provisional application No. 62/249,556, filed on Nov. 2, 2015.

(51) Int. Cl.
| | |
|---|---|
| *G06Q 30/06* | (2012.01) |
| *G05B 19/048* | (2006.01) |
| *B25H 3/00* | (2006.01) |

(52) U.S. Cl.
CPC .......... *G05B 19/048* (2013.01); *B25H 3/00* (2013.01); *G05B 2219/37618* (2013.01)

(58) Field of Classification Search
None
See application file for complete search history.

(56) References Cited

U.S. PATENT DOCUMENTS

| | | | |
|---|---|---|---|
| 7,557,709 B2 | 7/2009 | Flores et al. | |
| 7,932,824 B2 | 4/2011 | Flores et al. | |
| 2007/0023193 A1* | 2/2007 | King | G07C 9/00896 |
| | | | 166/387 |
| 2008/0059338 A1 | 3/2008 | Hubbard | |
| 2009/0071854 A1* | 3/2009 | Martin | B25H 3/02 |
| | | | 206/373 |
| 2009/0072029 A1 | 3/2009 | Martin | |
| 2011/0025503 A1* | 2/2011 | Weaver | G08B 21/24 |
| | | | 340/572.1 |

FOREIGN PATENT DOCUMENTS

| | | |
|---|---|---|
| WO | 2005028165 A1 | 3/2005 |
| WO | 2013188566 A1 | 12/2013 |

* cited by examiner

*Primary Examiner* — Ali Naraghi
(74) *Attorney, Agent, or Firm* — Kriegsman & Kriegsman

(57) ABSTRACT

A tool management system includes a plurality of individual tool retention units that are in electronic communication with a central webserver. Each tool retention unit is designed to independently monitor a designated toolset and transmit tool use data to the webserver. The data compiled by the webserver can be routinely evaluated to ensure proper accountability of all tools within a particular workspace. Due to the autonomous nature of each unit, subsets of tools within a larger monitored collection can be added, removed or replaced without disruption of monitoring amongst the remainder of tools. In one embodiment, a tool retention unit is constructed as a chest comprising a plurality of individual, swappable drawers housed within a common frame. In use, each drawer is provided with a controller that is configured to monitor its designated toolset and transmit any tool-related data to a main controller in communication with the webserver.

12 Claims, 4 Drawing Sheets

TOOL MANAGEMENT SYSTEM

FIELD OF THE INVENTION

The present invention relates generally to toolboxes and, more particularly, to toolboxes which are specifically designed to monitor and thereby account for a set of individual tools retained therein.

BACKGROUND OF THE INVENTION

Handheld tools, such as wrenches, pliers and screwdrivers, are commonly used in a wide range of applications. To facilitate project productivity, a large quantity of tools is commonly maintained in an organized fashion within a designated workspace, such as a commercial or residential workshop.

In many environments, tool monitoring and accountability is essential. For instance, aircraft construction and/or maintenance workshops typically utilize a large quantity of very specific tools. The accountability of such tools is essential not only to prevent workplace theft, as many of the individual tools are often expensive in nature, but also to ensure proper aircraft safety. As can be appreciated, inadvertent misplacement of a single instrument within the body of an aircraft can pose significant dangers. As a result, in such precarious environments, it is essential that the workspace be limited to only the tools that are truly required and, in turn, maintained with full accountability for each tool.

Accordingly, tool storage devices, commonly referred to in the art simply as toolboxes, are designed to collect and retain a set of individual tools in an organized fashion. One type of toolbox which is well known in the art includes a cabinet, or chest, which houses a plurality of individual, slidable drawers. Each drawer includes an insert, often foam or rubber in construction, which is provided with a plurality of uniquely configured recesses, each recess being shaped to fittingly receive a corresponding tool. In this manner, a set of tools can be organized for ease of access and storage. Often, each recess is coated with a bright color to help recognize when a particular tool is not present in the storage device.

An electronic, or smart, toolbox is one type of toolbox that electronically monitors the presence of individual tools retained therein. Specifically, a plurality of sensors is provided in the toolbox to account for the presence of each instrument, with one sensor designated for each tool. In turn, each sensor in each drawer of the toolbox is connected to a common, or main, controller. As such, a single controller can monitor the presence of every tool within the toolbox, log historical data, and provide appropriate notifications to the user regarding instrument status via a monitor in communication therewith (e.g., all instruments present, tool x missing from toolbox, etc.). Additionally, smart tool boxes are often provided with login capabilities (e.g., using RFID technology) to correlate the accountability of instruments with certain personnel.

Smart toolboxes of the type as described above are uniquely designed and programmed for a specific set of instruments. This ad hoc nature of smart toolboxes introduces a notable shortcoming. Specifically, it has been found that certain worksites often engage in a variety of different undertakings, each task often requiring a unique set of instruments. For example, an aircraft construction workspace may be used to work on different models of aircraft engines, with each model requiring a unique set of instruments.

Under the circumstance set forth above, the preprogrammed, unmodifiable configuration of conventional smart toolboxes does not afford the user with the ability to readily swap certain tools from the set (e.g., for a new project or if certain instruments require upgrading or replacement). Rather, every time a single instrument is added or removed from the set of tools, the main controller needs to be reprogrammed to reflect the change in inventory (e.g., by shipping the smart tool box back to the manufacturer for reprogramming). As a consequence, the use of conventional smart toolboxes in complex, potentially dangerous and/or high volume work environments has been found to be both time consuming and highly inefficient.

Further, smart toolboxes of the type as described above have been found to be relatively expensive to implement. In particular, the main controller is required to, inter alia, (i) monitor the status of every tool and drawer in the toolbox, (ii) log historical tool use data, and (iii) interface with workspace personnel and administrators to provide access to such data. To meet all its functional requirements, the main controller needs substantial processing power, which commensurately increases overall manufacturing costs.

SUMMARY OF THE INVENTION

It is an object of the invention to provide a new and improved system for managing a set of tools.

It is another object of the present invention to provide a system as described above that organizes the set of tools in an easily accessible manner.

It is yet another object of the present invention to provide a system as described above that electronically monitors each tool and compiles historical tool usage data in order to account for the entire tool set.

It is still another object of the present invention to provide a system as described above that allows for dynamic modification of the particular tools to be managed.

It is yet still another object of the present invention to provide a system as described above that is inexpensive to construct, easy to configure, and simple to use.

Accordingly, as one feature of the present invention, there is provided a system for managing a plurality of tools, the system comprising (a) a first tool retention unit for storing and monitoring a first toolset, (b) a second tool retention unit for storing and monitoring a second toolset, the second tool retention unit operating independently of the first tool retention unit, and (c) a central controller in electronic communication with the first and second tool retention units, the central controller compiling tool monitoring data from the first and second tool retention units.

Various other features and advantages will appear from the description to follow. In the description, reference is made to the accompanying drawings which form a part thereof, and in which is shown by way of illustration, an embodiment for practicing the invention. The embodiment will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

In the drawings wherein like reference numerals represent like parts.

DETAILED DESCRIPTION OF THE INVENTION

Tool Management System 11

Figure 1:
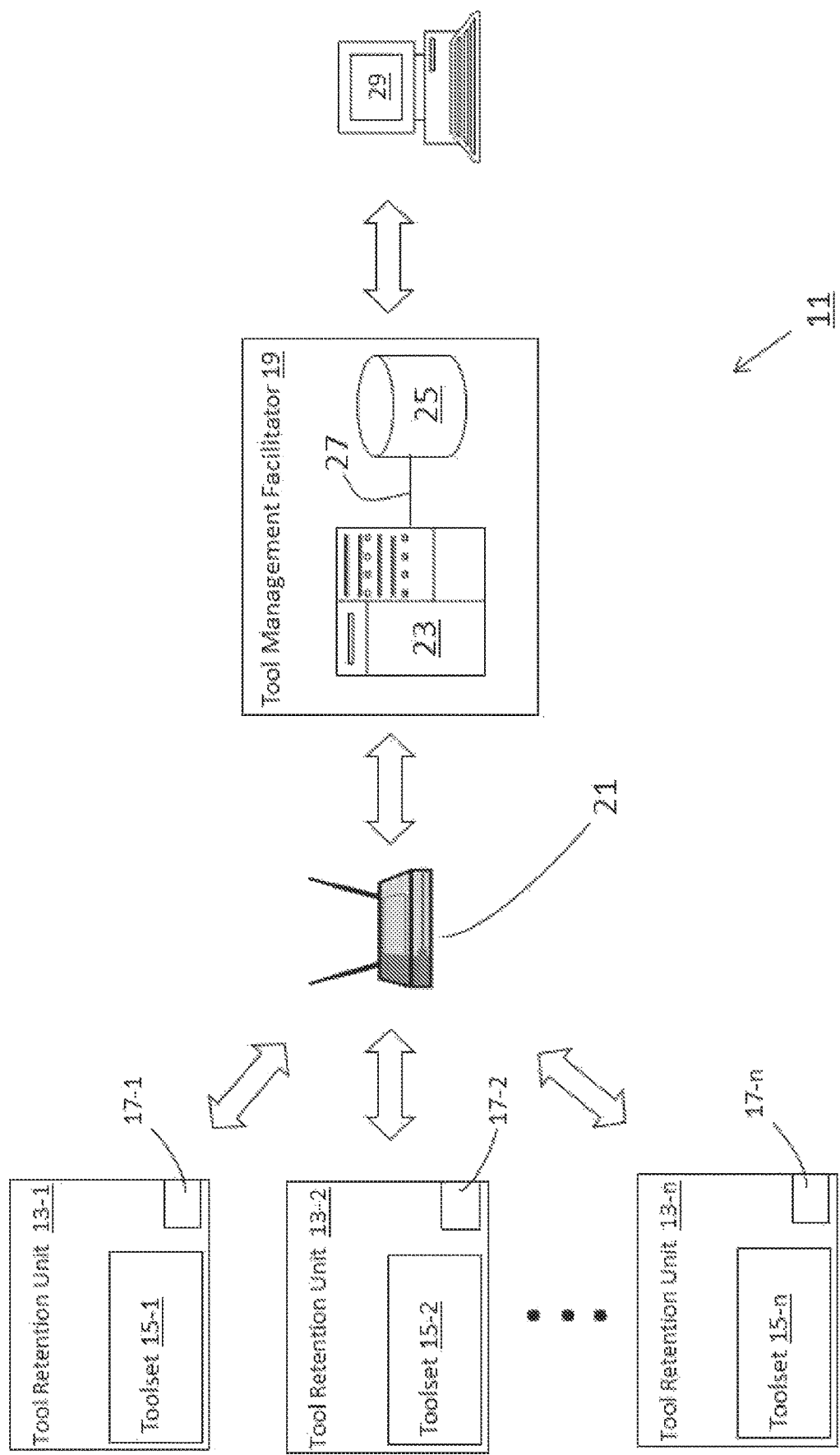
FIG. 1 is a simplified block representation of a tool management system constructed according to the teachings of the present invention.

Referring now to FIG. 1, there is shown a tool management system constructed in accordance with the teachings of the present invention, the tool management system being identified generally by reference numeral 11. As will be explained further in detail below, tool management system 11 is designed to monitor and thereby account for a collection of tools within a designated workspace. As a primary feature of the present invention, system 11 is able to modify the collection of tools to be monitored without substantial disruption of operation.

As defined therein, use of the term "tool" denotes any handheld instrument, such as a screwdriver, hammer or the like. In the description that follows, system 11 is occasionally described in connection with the management of handheld tools in a mechanical-type workspace, such as an aircraft construction workshop. However, it should be noted that the present invention is not limited to a particular type of tool or a particular type of environment. Rather, it is to be understood that the principles of the present invention could be applied to any environment where instrument accountability is important, or even in certain circumstances critical, such as a hospital operating room.

System 11 comprises a plurality of independently operating tool retention units 13-1 thru 13-n. As will be explained further below, each of units 13-1 thru 13-n is specifically designed to store a corresponding set of tools, which are represented herein as toolsets 15-1 thru 15-n, respectively. Additionally, each of units 13-1 thru 13-n is provided with at least one controller, which is represented herein as controllers 17-1 thru 17-n, respectively. In use, each unit controller 17 is configured to continuously monitor a corresponding toolset 15 in its associated unit 13 and, in turn, log various forms of tool-related data (e.g., tool usage, missing instruments, etc.).

One controller 17 in each tool retention unit 13 is in electronic communication with a tool management facilitator 19 via a local router 21 or one or more other similar types of intermediary communication devices. In this capacity, tool management facilitator 19 serves as the functional hub of system 11 by, inter alia, (i) accumulating tool-related data from each of the plurality of tool retention units 13, and (ii) providing browser-based means for examining such data to ensure proper tool accountability.

Tool management facilitator 19 preferably includes a central controller, or webserver, 23 and a data storage device 25 in electronic communication with webserver 23 via network path 27. It is to be understood that webserver 23 and data storage device 25 may be either housed at the toolbox itself, a common facility, or remotely connected.

Through connection with webserver 23, a compute device 29, such as a desktop computer or web-enabled mobile device, can easily view tool status data in real time (e.g., which person is currently accessing a particular unit 13, whether the entire collection of tools is accounted for, etc.). This enables tool inventory data to be used for multiple purposes. For instance, by monitoring and displaying tool inventory data in a designated workspace (e.g., on an enlarged computer monitor in the workspace), full accountability of such tools can be maintained, thereby minimizing the risk of any hazardous tool-related conditions (e.g., leaving an instrument within the body of an aircraft). Additionally, by monitoring tool inventory data, management can more effectively analyze tool usage amongst workplace personnel and thereby track tool use trends as well as detect misuse or other forms of unscrupulous activity, such as tool theft.

Tool Retention Unit 13-1

As referenced briefly above, each tool retention unit 13 is designed as a self-contained, independently operating tool management device which is configured to store and monitor a designated toolset 15. As a result, the entire collection of toolsets 15 managed by system 11 can be modified on the fly by simply by adding, removing, replacing or reconfiguring individual tool retention units 13 or subcomponents thereof.

Figure 2:
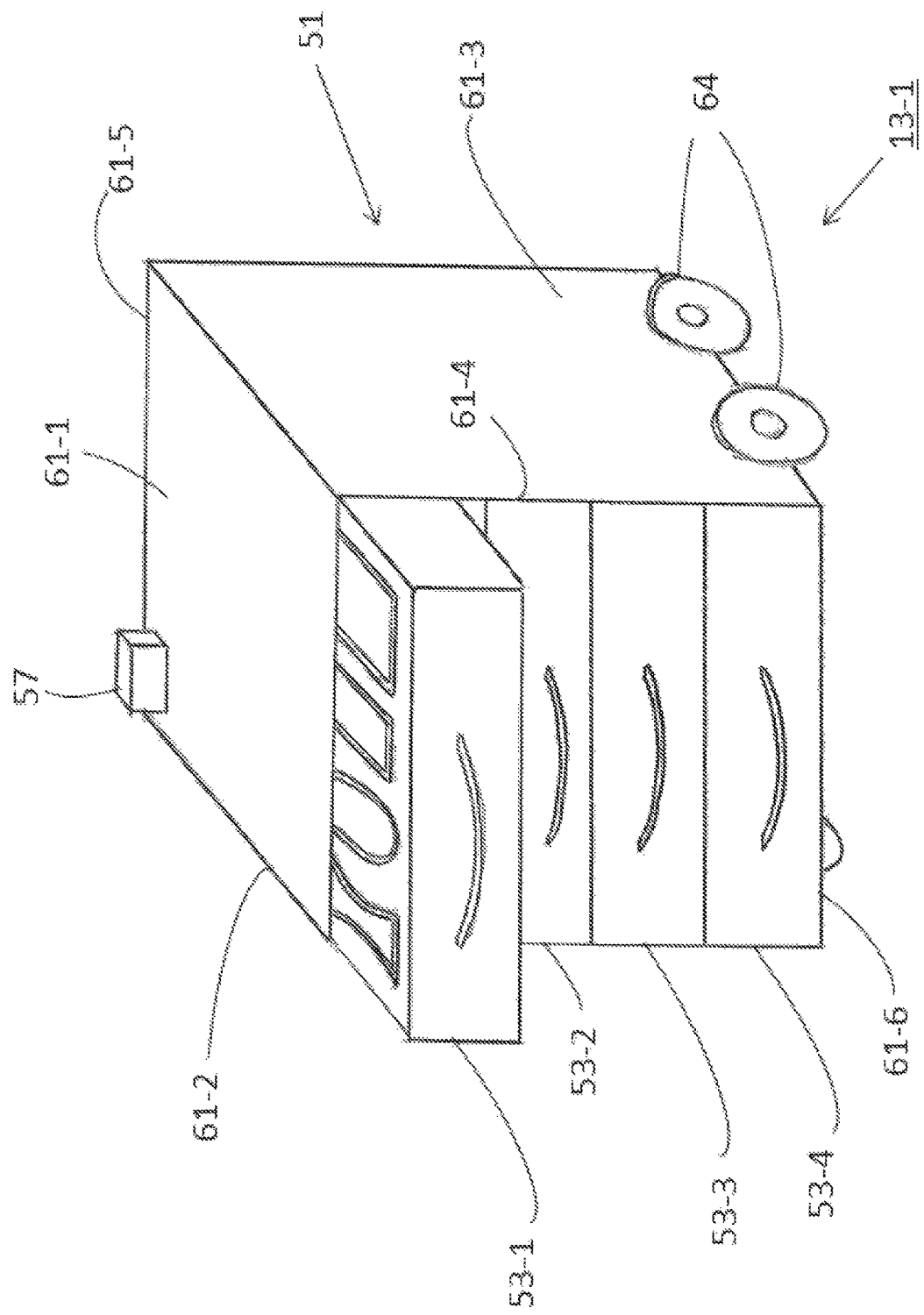
FIG. 2 is a front perspective view of one of the tool retention units shown in FIG. 1, the tool retention unit being shown with an individual tool container partially withdrawn from the common housing.
Figure 3:
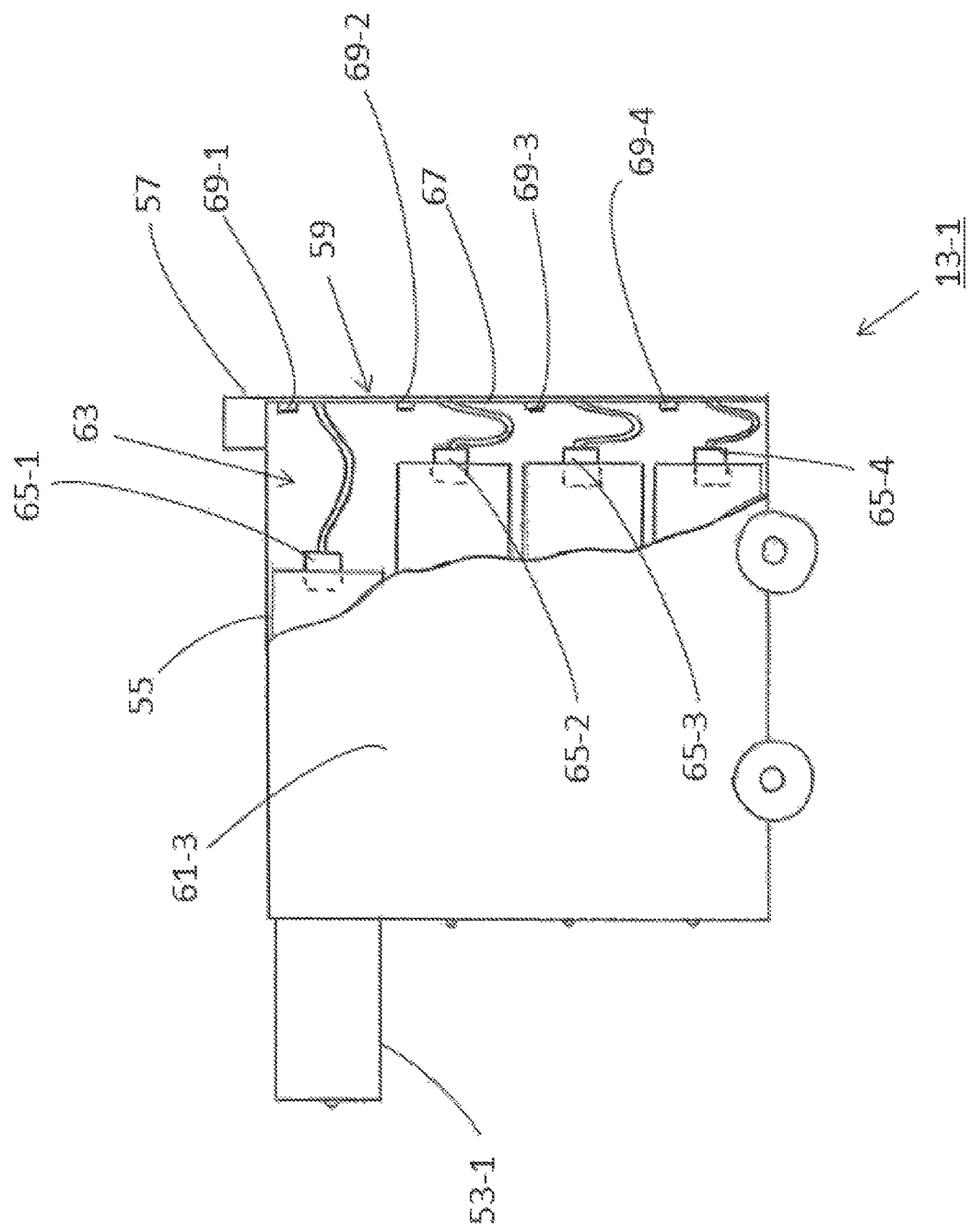
FIG. 3 is a right side view, broken away in part, of the tool retention unit shown in FIG. 2.

Referring now to FIGS. 2-3, the details of tool retention unit 13-1 are shown in greater detail. As will be described further below, tool retention unit 13-1 is designed as a unitary device that compartmentalizes, or fragments, tool monitoring into a plurality of independently operating modules. This, in turn, enables the toolset 15-1 monitored by unit 13-1 to be dynamically modified, as needed, by adding, removing, reconfiguring and/or replacing the individual modules.

Specifically, tool retention unit 13-1 is represented herein as comprising an enclosure, or common housing, 51 into which are slidably mounted a plurality of individual tool containers 53-1 thru 53-4. In this manner, common housing 51 retains the plurality of individual containers 53 together to form a unitary device.

Housing 51 is represented herein as comprising a chest-type cabinet, or frame, 55, a unit, or cabinet, controller 57 fixedly mounted on cabinet 55, and a communication medium 59 which electronically connects unit controller 57 with a corresponding controller located in each container 53, as will be explained further below. During normal operation, tool monitoring data compiled from each container 53 is received by unit controller 57 which can serve as the equivalent of facilitator 19 or, in turn, be transmitted from unit controller 57 to a remote, large-scale facilitator 19 for storage and analysis.

Frame 55 is represented herein as a generally rectangular cabinet comprising a top panel 61-1, a pair of opposing side panels 61-2 and 61-3, an open front panel 61-4, a rear panel 61-5 and a bottom panel 61-6 that together define a partially enclosed interior cavity 63. Preferably, interior cavity 63 is appropriately dimensioned to receive a plurality of individual tool containers 53 in a stacked relationship. As shown herein, a plurality of wheels 64 is mounted on frame 55 to facilitate transport of unit 13-1 within the workspace.

Communication medium 59 is represented herein as comprising a plurality of cabinet connectors 65-1 thru 65-4, with one designated for each tool container 53. In turn, each connector 65 is electrically connected to main controller 57 through a network of interconnected data cables 67 (e.g., Ethernet cables).

It should be noted that communication medium 59 is not limited to the use of a network, or system, of electrical connectors and cables. Rather, it is to be understood that communication medium 59 could use alternative types of data transmission solutions, such as wireless transmission technologies, without departing from the spirit of the present invention.

Housing 51 is also preferably provided with a plurality of sensors 69-1 thru 69-4 for detecting the open/closed status of tool containers 53-1 thru 53-4, respectively. Sensors 69 are fixedly mounted on frame 55 proximate rear panel 61-5, with each sensor 69 in electronic communication with main controller 57 (e.g., via connection to communication medium 59).

It should be noted that sensors 69 can mounted in alternative locations within housing 51 depending on the type of sensing mechanism utilized. The only requirement is that each sensor 69 be located within a few millimeters of the tool container 53 which it is designated to monitor.

Each sensor 69 represents any means for detecting the position of a tool container 53 within frame 55 (i.e., open condition or closed position) including, but not limited to, mechanical switches, proximity sensors, radio frequency identification (RFID) devices, and light sensors. For instance, sensor 69 may be in the form of an electrical contact switch that is positioned so as to selectively engage a corresponding tool container 53. In other words, with tool container 53 disposed in its closed position within frame 55, sensor 69 remains closed. However, when tool container 53 is pulled open, sensor 69 opens which in turn sends an open signal to controller 57 denoting the status change.

Although not shown herein, housing 51 could additionally be provided with a lock mechanism that is mounted on frame 55 in selective engagement with individual tool containers 53. Accordingly, through activation of the lock mechanism (e.g., by receiving a lock activation signal from main controller 57), one or more of the individual tool containers 53 can be mechanically retained in a closed position, thereby preventing tool withdrawal therefrom.

As noted briefly above, each tool container 53 is designed to store and monitor a designated set of tools. In this manner, each container 53 functions as an independently operating electronic tool storage device that compiles and transmits tool status data to main cabinet controller 57. In turn, main controller 57, which is not directly responsible for any tool management, performs a limited amount of data logging from the various containers 53 and transmits the collected tool monitoring data to server 23.

Figure 4:
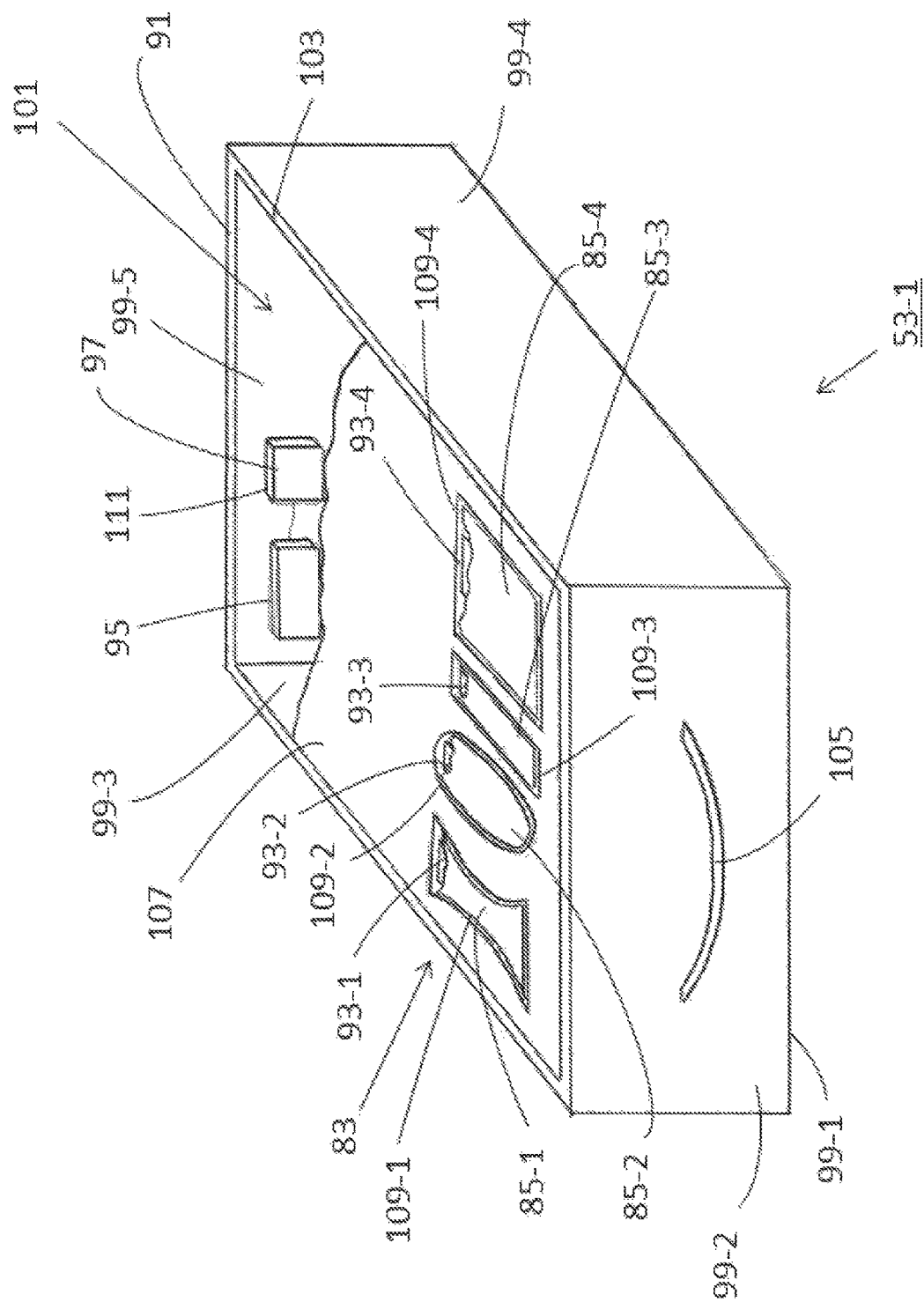
FIG. 4 is an enlarged, front perspective view, broken away in part, of the partially withdrawn tool container shown in FIG. 4.

Referring now to FIG. 4, there is shown a front perspective view, broken away in part, of the top tool container 53-1 in tool retention unit 13-1. As can be seen, container 53-1 is designed to retain a toolset 83 consisting of four separate tools 85-1 thru 85-4.

In the present embodiment, tool container 53-1 is in the form of a drawer that can be slidably coupled to frame 55, for example, using complementary brackets (not shown). Accordingly, tool container 53-1 is adapted to slide between a closed position in which toolset 83 is disposed entirely within cavity 63 (therefore unavailable for access), and an open position in which toolset 83 is disposed outside of cavity 63 (therefore available for access).

However, it should be noted that each tool container 53 is not limited to one particular design. Rather, as will be explained further below, tool container 53 represents any construction or form that is suitable for retaining a plurality of tools.

As shown in FIG. 4, container 53-1 comprises a drawer 91 adapted to retain toolset 83 in an organized fashion, a plurality of sensors 93-1 thru 93-4 for detecting the presence of tools 85-1 thru 85-4, respectively, within drawer 91, a container controller 95 in electrical connection with sensors 93 for monitoring the status of tools 85, and a connector 97 in electrical connection with controller 95 for facilitating communication between container controller 95 and main cabinet controller 57.

Drawer 91 comprises a bottom wall 99-1, a front wall 99-2, a left sidewall 99-3, a right sidewall 99-4 and a rear wall 99-5 that together define an interior receptacle 101 that is rendered accessible through an open top wall 103. A handle 105 is fixedly coupled to the exterior of front wall 99-2 to facilitate displacement of container 53-1 within enclosure 51. Although not shown herein, a plate, or lid, could be pivotally coupled to open top wall 103 of drawer 91 to selectively enclose interior receptacle 101.

An insert, preferably foam or rubber in construction, 107 is fittingly disposed within interior receptacle 101. Insert 107 is preferably molded or milled to define a plurality of recesses 109-1 thru 109-4 in its top surface. As can be seen, recesses 109-1 thru 109-4 are uniquely configured to fittingly receive corresponding tools 85-1 thru 85-4, respectively. Storing toolset 83 within container 53-1 in a predefined pattern serves to facilitate use, since the operator knows exactly where each tool 85 is located, as well as assist in tool monitoring, as will explained further below.

For ease of manufacturing and flexibility of use, insert 107 is represented herein as a separately formed item that is positioned in receptacle 101 during the assembly of container 53-1. However, it is to be understood that insert 107 could be integrally formed with walls 99 of drawer 91 without departing from the spirit of the present invention.

Sensors 93-1 thru 93-4 are preferably disposed within insert 107 in close proximity to recesses 109-1 thru 109-4, respectively. Each sensor 93 represents any device capable of detecting the presence of an instrument within its recess 109 and, in turn, transmitting an appropriate electrical signal. For instance, each sensor 93 may be in the form of a mechanical switch that is disposed within insert 107 so as to be contacted by a tool 85 when properly disposed within its corresponding recess 109. Alternatively, each sensor 93 may be in the form of other sensing devices, such proximity sensors, light sensors, radio frequency identification (RFID) tags or the like, without departing from the spirit of the present invention.

As referenced above, the output of each sensor 93 is electrically connected to container controller 95 (e.g., through direct connection via a corresponding wire). Because toolset 83 is designed for storage in a predefined arrangement, container controller 95 can be specifically programmed to monitor toolset 83 by associating each tool 85 with its associated sensor 93. Furthermore, because container controller 95 is responsible for the management of a limited number of tools 83, preferably no greater than 100 tools in total, controller 95 requires limited processing power. As a consequence, a relatively inexpensive processor can be utilized for container controller 95.

As noted briefly above, connector 97 is in electrical connection with controller 95 and is adapted to be releasably electrically coupled to a corresponding cabinet connector 65. As such, a communication path can be established between each tool container 53 and cabinet controller 57.

In the present embodiment, connector 97 is located in the rear of insert 107. An opening 111 is provided in rear wall 99-5 to provide access to container connector 97. Accordingly, a cabinet connector 65 can be inserted through opening 111 and into electrical contact with container connector 97.

With sensors 93, container controller 95 and connector 97 all fixedly mounted therein, insert 107 can effectively serve as a unitary tool container (i.e., without any particular drawer associated therewith). In this manner, self-contained insert 107 can be disposed into a wide variety of different drawer styles and configurations, as long as the footprint and depth of the drawer is greater than insert 107. This enables for greater ease in swapping tool containers from tool retention unit 13-1, with each insert 107 serving as a generic, or standardized, component that can be easily installed into a wide variety of different housing types.

Preferably, connectors 65 and 97 are in the form of a complementary pair of components that can be mechanically coupled together to establish an electrical communication path therebetween. For instance, connectors 65 and 97 may be in the form of a complementary pair of male/female pin-type connectors. However, it is to be understood that alternative means for selectively establishing a communication path between each tool container 53 and main controller 57 could be implemented without departing from the spirit of the present invention, such as through the use of magnetic coupling, inductive coupling, or wireless connectivity.

Operation of Tool Management System

Referring back to FIG. 1, tool management system 11 preferably operates in the following manner. As a part of the initial setup, each tool retention unit 13 is specifically configured to monitor its designated toolset 15. In other words, each tool retention unit 13 preferably designed to retain its designated toolset 15 in a predefined, organized arrangement. Additionally, at least one controller in unit 13 is programmed to receive tool detection signals from its individual sensors, such as sensors 93, and in turn monitor the status of specific individual tools in its toolset 15 using the tool detection signals.

For instance, in connection with multi-container unit 13-1 shown in FIGS. 2 and 3, each container 53 is preferably designed to retain its toolset 83 in an organized arrangement. Accordingly, insert 107 is preferably molded or milled with recesses 109 that are dimensioned to fittingly receive the individual tools 85 in toolset 83.

Furthermore, each container controller 95 is specifically programmed to monitor its designated toolset 83. Programming of each container controller 95 can be achieved, inter alia, by connecting container 53 to a computer which is installed with a designated software application for container configuration (or by accessing the software application from webserver 23 using the computer). Preferably, as part of the programming process, information regarding each tool 85 in the monitored toolset 83 is associated with each sensor 93 (e.g., a tool identifier, such as a name, model and/or image). In this manner, the information can be used by controller 95 to help a user more easily identify a tool missing from container 53, as will be explained further below.

Once properly configured, each container 53 is installed in the housing 51 of a tool retention unit 13-1. It is to be understood that if container 53 is constructed as comprising a drawer 91, the entire drawer-like container 53 is slidably mounted within housing 51. Alternatively, if container 53 is constructed simply as an insert 107 which functions as a self-contained tool retention device (i.e., with sensors 93, controller 95 and connector 97 all integrated therein), insert 107 is simply disposed inside an open (i.e. unused) drawer in common housing 51.

Thereafter, installation is achieved by establishing a data communication path between each container 53 and cabinet controller 57, for example, by mechanically coupling together mating electrical connectors 65 and 97. Additionally, each container 53 is preferably slidably disposed within interior cavity 63 of frame 55 to selectively restrict access to toolset 83.

Upon completion of the initial setup, each tool retention unit 13 continuously monitors the status of its corresponding toolset 15, as shown in FIG. 1. If one or more tools in the toolset 15 are withdrawn from tool retention unit 13, its unit controller 17 logs the tool usage event. In turn, the compiled data is periodically transmitted to tool management facilitator 19 based upon predefined data transmission protocols (e.g., at predefined intervals, upon any tool activity, etc.).

Central controller 23 receives all tool-related data from units 13 and stores relevant tool activity data in database 25. As a feature of the present invention, a monitoring party can use a web-enabled device, such computer 29, to discern, in near real time, the status of all tools within a designated workspace. For instance, a monitoring party, who is either located within the workspace or remotely situated, can determine at any time, among other things, which particular instruments are not secured in their proper tool retention units 13 along with relevant information relating to such instruments (e.g., a name, model or image). By extracting information regarding missing instruments (e.g., through use of computer 29 or a small screen display mounted on its tool retention unit 13 in direct electronic communication with controller 17) potentially dangerous workspace conditions can be avoided.

As a principal feature of the invention, the construction of tool management system 11 allows for considerable ease in modifying the collection of tools to be monitored within a designated workspace. More particularly, system 11 allows for certain subsets of tools from a larger collection to be added, removed or replaced on the fly without disruption to the monitoring of the remainder of tools in the collection.

Modification of the collection of tools to be monitored can be readily achieved by removing one or more tool retention units 13 from tool management system 11 and/or adding one or more new, used or reconditioned tool retention units 13 to tool management system 11. Both removing and/or adding tool retention units 13 from system 11 can be achieved by interfacing with a designated software application that is accessible, for example, through webserver 19. More preferably, removing and/or adding tool retention units 13 from system 11 is achieved simply via an automatic, hot-swap handshake between each container controller 95 and cabinet controller 57 that is affected when the connection between the two is made or broken. During such an automatic handshake, container controller 95 preferably uploads its unique identifier as well as pertinent aspects of its configuration to cabinet controller 57 (e.g. its tool types and names as well as its layout image). In turn, cabinet controller 57 can utilize this information to present pertinent data to the user via its user interface (UI).

In this capacity, it is to be understood that the collection of toolsets 15 managed by system 11 can be easily modified to accommodate different needs within a designated workspace. For instance, when a particular toolset 15 is required for a specific application, the unit 13 housing that toolset 15 can be integrated into system 11. However, when the workspace is utilized for an alternative application, the unit 13 housing the toolset 15 can be temporarily removed, or decommissioned, from system 11 pending further use. This results in better overall control of tools within a workspace.

As another example, a single tool within a designated toolset 15 may require replacement and/or upgrading. Rather than disable the entire tool management system 11, the unit 13 which houses the toolset 15 can be either (i) temporarily deactivated to allow for reconfiguration, as needed, to accommodate the tool change or (ii) replaced entirely with another unit 13 that houses the desired toolset 15.

As can be appreciated, multi-container unit 13-1 shown in FIGS. 2 and 3 is particularly well suited to accommodate modification of the toolset 15 which it is configured to monitor. Specifically, as referenced above, each container 53, whether constructed as either a whole drawer-like unit or a removable drawer-type insert, includes its own controller 95 and therefore functions as an independently operating tool monitoring device. Further, each container 53 is designed to be electrically and mechanically coupled to common housing 51 in a quick and easy fashion.

Accordingly, the collection of tools that is to be monitored by multi-container unit 13-1 can be modified by removing, replacing or reconfiguring individual tool containers 53 from common housing 51, either as a whole drawer-like unit or as a removable drawer-type insert. Furthermore, due to its limited size and number of housed tools, each container 53 can be easily transported, for example, to a reconfiguration site where container 53 is structurally modified and/or reprogrammed to monitor a new set of instruments. In fact, it is envisioned that the ease in handling individual tool containers 53 encourages the frequent swapping of containers 53 amongst a multitude of different multi-container units 13-1 in order to suit the needs of various applications within a workspace.

Features and Advantages of the Present Invention

The construction and operation of tool management system 11, as set forth in detail above, yields a number of notable advantages over traditional tool storage solutions.

As a first advantage, system 11 enables a user-modifiable collection of tools to be conveniently stored and acutely monitored. Whereas conventional smart toolboxes are only designed to monitor a designated toolset, system 11 allows for certain subsets of tools within a larger monitored collection to be added, removed or replaced, on the fly, at various degrees or levels. For instance, on a larger scale, an entire tool retention unit 13-1 (and all instruments housed and monitored therein) can be readily integrated into and/or segregated from tool management system 11 without affecting the monitoring of other units 13. On a smaller scale, a single container 53, whether constructed as either as a whole drawer-like unit or as a removable drawer-type insert that holds a limited number of instruments (e.g., only one tool), could be removed from or added into common housing 51 without affecting the monitoring of other containers 53 held within the same unit 13-1. This enables the scope of dynamic tool modification to range from as little as a single instrument to as many as hundreds of instruments.

As a second advantage, system 11 is relatively inexpensive to implement because tool monitoring operations are spread amongst a plurality of controllers 17-1. With respect to multi-container unit 13-1, limited processing power is required by each container controller 95 since each container 53 is preferably designed to hold and monitor no greater than 100 tools. Furthermore, cabinet controller 57 is not responsible for any direct tool monitoring, since all tool monitoring is accomplished by the individual container controllers 95. Rather, cabinet controller 57 is responsible for, inter alia, logging cabinet data, such as who is logged into the cabinet when and which drawers are opened or closed at what times, as well as logging certain usage data from the various container controllers 95 (e.g., when a tool is used) and, in turn, transmitting logged data to facilitator 19. As a consequence, no single controller in multi-container unit 13-1 (i.e., neither container controllers 95 nor cabinet controller 57) requires high processing power. Because complex controllers with high processing capabilities typically introduce a substantial increase in cost, the present design is rendered comparatively inexpensive.

As a third advantage, system 11 is relatively easy to implement. Preferably, each tool retention unit 13 can be integrated into or segregated from system 11 through a user-intuitive configuration application that is accessible from webserver 19 via a web browser or preferably via an automatic, hot-swap handshake between each container controller 95 and the cabinet controller 57 that is affected when the connection between the two is made or broken. During such an automatic handshake, container controller 95 preferably uploads its unique identifier as well as pertinent aspects of its configuration to cabinet controller 57 (e.g. its tool types and names as well as its layout image). In turn, cabinet controller 57 can utilize this information to present pertinent data to the user via its user interface. Furthermore, with respect to multi-container unit 13-1, an individual drawer-like container 53 that has been properly programmed can be easily installed into common housing 51 through quick connection of mating connectors 65 and 97.

Design Modifications and Alternative Embodiments

The embodiment shown above is intended to be merely exemplary and those skilled in the art shall be able to make numerous variations and modifications to it without departing from the spirit of the present invention. All such variations and modifications are intended to be within the scope of the present invention as defined in the appended claims For instance, tool retention unit 13-1 is described above as having a chest-like construction with multiple, individual drawer-like containers 53 which are housed within a common, floor-mounted, cabinet-style frame 55. However, it should be noted that tool retention unit 13-1 is not limited to one particular configuration or form. Rather, it is to be understood that tool retention unit 13 could be manufactured in any construct or form that is suitable for retaining a plurality of tools.

As an example, tool retention unit 13-1 could be alternatively constructed as a portable handheld caddy which includes a small, box-like housing that is adapted to receive a plurality of individual trays. In a similar fashion to tool retention unit 13-1, each tray in the caddy-like unit could be provided with its own processor that is responsible for monitoring a designated set of tools. In this manner, individual trays could be swapped, as needed, to modify the collection of tools to be managed.

As another example, tool retention unit 13-1 could be alternatively constructed as a workstation which includes a worktable, or workbench, on which a plurality of individual modules can be mounted, for example, in a stacked relationship. In a similar fashion to tool retention unit 13-1, each module could be provided with its own processor that is responsible for monitoring a designated set of tools. In this manner, individual modules could be swapped, as needed, to modify the collection of tools to be managed.

As yet another example, it should be noted that each tool retention unit 13 need not include a plurality of individual, self-operating containers (e.g., containers 53) retained within a common housing (e.g., housing 51). Rather, tool retention unit 13 may consist of a single controller that is responsible for monitoring a limited set of tools and, in turn, transmitting tool status data to facilitator 15. For instance, tool retention unit 13 could be in the form of a small, self-contained tool storage device, such as a tool belt, a handheld bin-type toolbox, or even a single tool container 53, without departing from the spirit of the present invention.

As yet still another example, it should be noted that facilitator 19 need not be a separate, or remote, component from tool retention unit 13-1. Rather, it is to be understood that facilitator 19 could be directly integrated into one tool retention unit 13-1 to form a comprehensive, single component system. In this scenario, unit controller 17 would serve as the functional hub of the tool management system by (i) compiling tool-related data from each independent tool container 53 and (ii) creating an interface for extraction of such data for review (e.g., through an integrated display monitor or a separate compute device). In this manner, a single tool retention unit 13-1 can serve as an all-in-one tool management system which is able to monitor the status of multiple toolsets while, at the same time, allow for instantaneous adding, removing and/or swapping of individual tool containers 53 in order to modify the collection of tools under surveillance.

What is claimed is:

1. A system for managing a plurality of tools, the system comprising:
   (a) a first tool retention unit for storing and monitoring a first toolset, the first tool retention unit comprising a first set of sensors, each of the first set of sensors detecting the presence of a designated tool from the first toolset;
   (b) a second tool retention unit for storing and monitoring a second toolset, the second tool retention unit operating independently of the first tool retention unit, the second tool retention unit comprising a second set of sensors, each of the second set of sensors detecting the presence of a designated tool from the second toolset;
   (c) a common housing in which the first and second tool retention units are stored; and
   (d) a central controller in electronic communication with the first and second tool retention units, the central controller compiling tool monitoring data from the first and second tool retention units,
   (e) wherein the first tool retention unit comprises a first unit controller in electronic communication with the first set of sensors, the first unit controller being adapted to receive signals from the first set of sensors to monitor the first toolset, wherein the second tool retention unit comprises a second unit controller in electronic communication with the second set of sensors, the second unit controller being adapted to receive signals from the second set of sensors to monitor the second toolset, the first and second unit controllers being in electronic communication with the central controller.

2. The system of claim 1 wherein electronic communication established between the central controller and one of the first and second unit controllers can be suspended while maintaining electronic communication between the central controller and the other of the first and second unit controllers.

3. The system of claim 2 further comprising a third tool retention unit for storing and monitoring a third toolset, the third tool retention unit being in electronic communication with the central controller, the third retention unit operating independently of the first and second tool retention units.

4. The system of claim 1 further comprising a compute device in communication with the central controller for extracting compiled tool monitoring data.

5. The system of claim 4 wherein the central controller is in the form of a server which is accessible by the compute device.

6. The system of claim 1 wherein the central controller is located within the common housing.

7. The system of claim 6 wherein the first tool retention unit further comprises an insert in which is mounted the first set of sensors and the first unit controller.

8. The system of claim 7 wherein the insert is shaped to define a plurality of recesses, each of the plurality of recesses being configured to fittingly receive a corresponding tool from the first toolset.

9. The system of claim 8 wherein the first tool retention unit further comprises a drawer shaped to define an interior receptacle which is dimensioned to receive the insert, the drawer being adapted for displacement within the common housing between an open position and a closed position.

10. The system of claim 9 further comprising a drawer sensor in the common housing in electrical communication with the central controller, the drawer sensor detecting the position of the drawer.

11. The system of claim 7 wherein the first tool retention unit further comprises a first connector mounted in the insert, the first connector being in electrical communication with the first unit controller.

12. The system of claim 11 further comprising a second connector in the common housing in electrical communication with the central controller, the second connector being adapted for selective coupling with the first connector.

* * * * *